Nov. 1, 1966 R. H. HAYMAN 3,282,277
WATER CONDITIONING SYSTEM
Filed Feb. 25, 1964 2 Sheets-Sheet 1

INVENTOR.
RICHARD H. HAYMAN
BY
ATTORNEYS

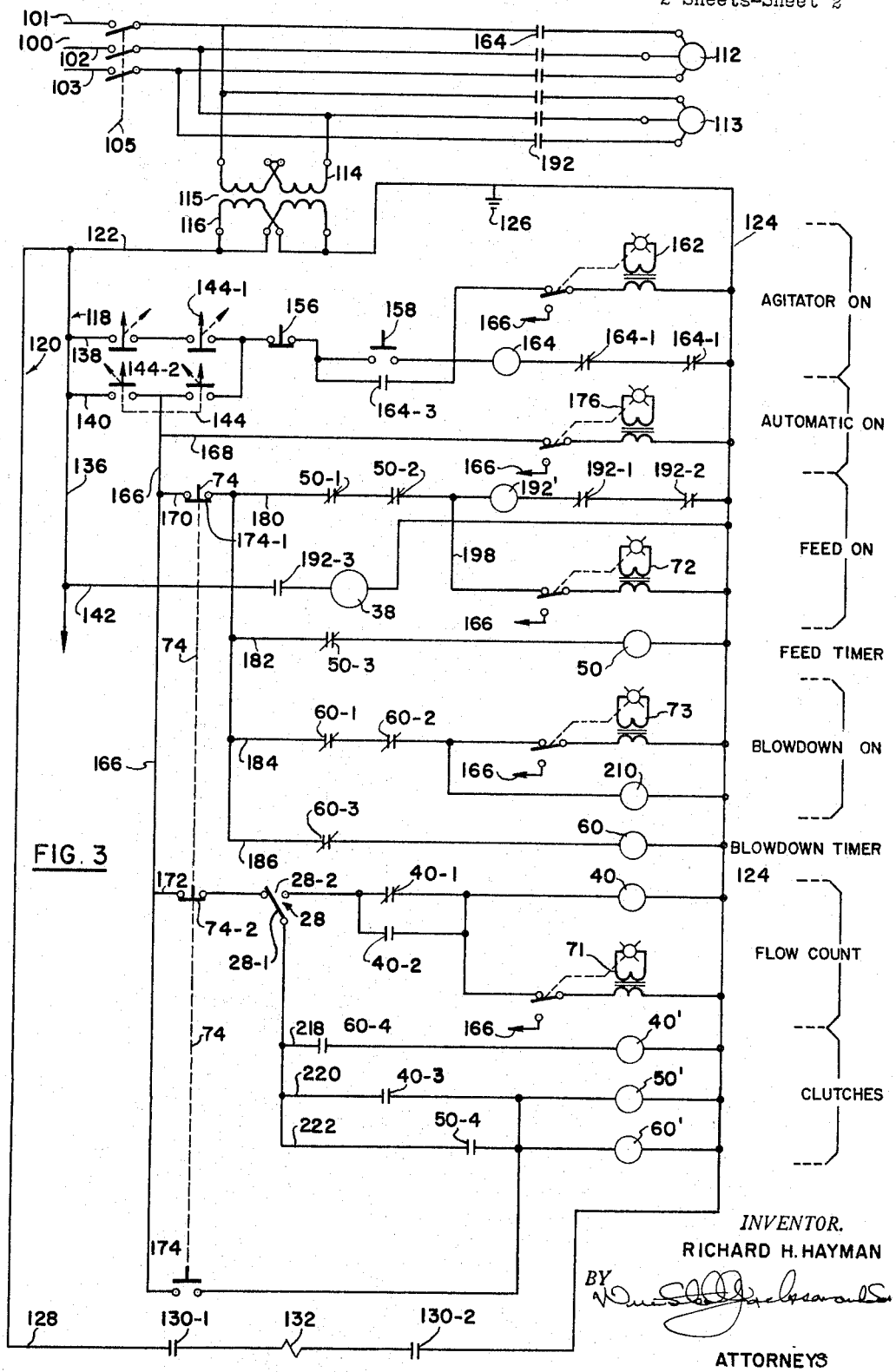

United States Patent Office 3,282,277
Patented Nov. 1, 1966

3,282,277
WATER CONDITIONING SYSTEM
Richard H. Hayman, 2534 Hallowell Road,
Huntingdon Valley, Pa.
Filed Feb. 25, 1964, Ser. No. 347,214
7 Claims. (Cl. 137—3)

This invention relates to automatic water conditioning systems and more particularly to automatically add chemicals to and blow down a circulating water system.

A purpose of the invention is to run a completely automatic water conditioning system.

A further purpose is to automatically condition a water system by the use of an electrical control circuit which senses the feedwater makeup and at predetermined intervals adds chemicals and blows down the system.

A further purpose is to add chemicals to a system with pumps that are operated by one or more timers.

A further purpose is to use electrical impulses controlled by makeup feedwater flow to start one or more timers which operate pumps.

A further purpose is to have a water conditioning system fail safe in the event of power failure.

A further purpose is to prevent overfeed of chemicals to a water conditioning system in the event of power failure and subsequent power restoration.

A further purpose is to use impulse contacts rather than holding contacts in a water conditioning feed system to prevent chemical overfeed in the event the makeup water flow stops, which could result in stopping the meter at a contact point.

A further purpose is to use flashing signal lights to show the system is operating.

A further purpose is to use push test lights to determine whether the system is operating properly.

A further purpose is to automatically control blowdown in a water conditioning system.

A further purpose is to utilize a system which omits the need for frequent dissolving of treatment chemicals and permits batch preparation of chemicals on an infrequent, periodic, basis.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 3 is a schematic drawing of the electrical circuitry of the form of the system shown in FIGURES 1 and 2.

Figure 1:
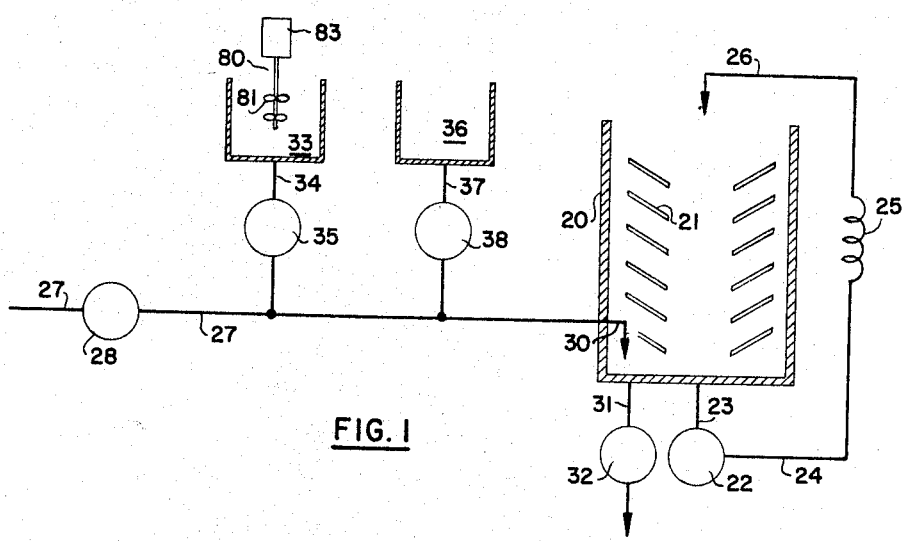
FIGURE 1 is a schematic showing of a water circulating system incorporating one form of the system of the invention.

Describing in illustration but not in limitation and referring to the drawings:

In most instances, it is necessary to chemically treat water in a circulating system. Water being used as a heat exchange medium in an air conditioning system for instance, or other heat exchange systems, is sampled and tested periodically and chemicals added manually when needed. In addition, periodic manual blowdown of the system is performed by bleeding a portion of the water content from the system to expel dissolved solids, sediment and foreign matter.

The present invention automatically conditions water in a system by sensing the makeup feedwater to automatically add chemicals to and blowdown the system.

The system operates by receiving electrical impulses from a makeup line water meter which are counted by an impulse counter. When the counter receives the number of pulses set on the counter dial, it will count out and start one or more timers which are installed for the purpose of controlling the amount of blowdown, chemical feed, and in some instances acid feed.

The blowdown and feed timer or timers will in turn energize the blowdown solenoid valve or diaphragm valve or motorized valve and the pumping equipment for a set time. At the timed out condition, the timer or timers will shut off and reset to zero and await the start of a new cycle as indicated by the setting on the impulse counter. A control panel also includes a starter and stop start buttons for chemical agitating equipment.

The system is of a fail safe design wherein in the event of a power failure, the timing cycles will not reset to zero but will remain at the position fixed by the power failure. Upon resumption of power the panel will resume operation at the point of shutdown and therefore will not overfeed. Similarly, should the water flow of the makeup line be stopped at a time when the meter is on an impulse contact, the impulse counter in the panel will not continue to operate since it is responsive only to impulse current, not to continuous current.

One form of the system of the invention can be used for instance in an arrangement as shown in FIGURE 1. A cooling tower 20 having deflecting vanes 21 has a circulating pump 22 which pumps water from the bottom of the tower through conduit 23 and passes it through line 24 to a heat exchanger or a head load 25 and back into the cooling tower through line 26. Water which is lost through evaporation or leaks in the system is made up by feedwater passing through conduit 27 through meter 28 and into the system at 30. The system is blown down through blowdown line 31 controlled by blowdown valve 32.

Chemicals to condition the makeup water are added from container 33 through line 34 through feed pump 35 to the makeup line 27, or directly into any other part of the system. Optionally acid is added from container 36 through line 37 through feed pump 38 to makeup line 27, or directly into any other part of the system. The pumps 35 and 38 are of the conventional proportioning type.

The present invention is concerned with automatically operating pumps 35 and 38 and blowdown valve 32 whereby the circulating water of the system is constantly kept at the proper chemical condition.

Figure 2:
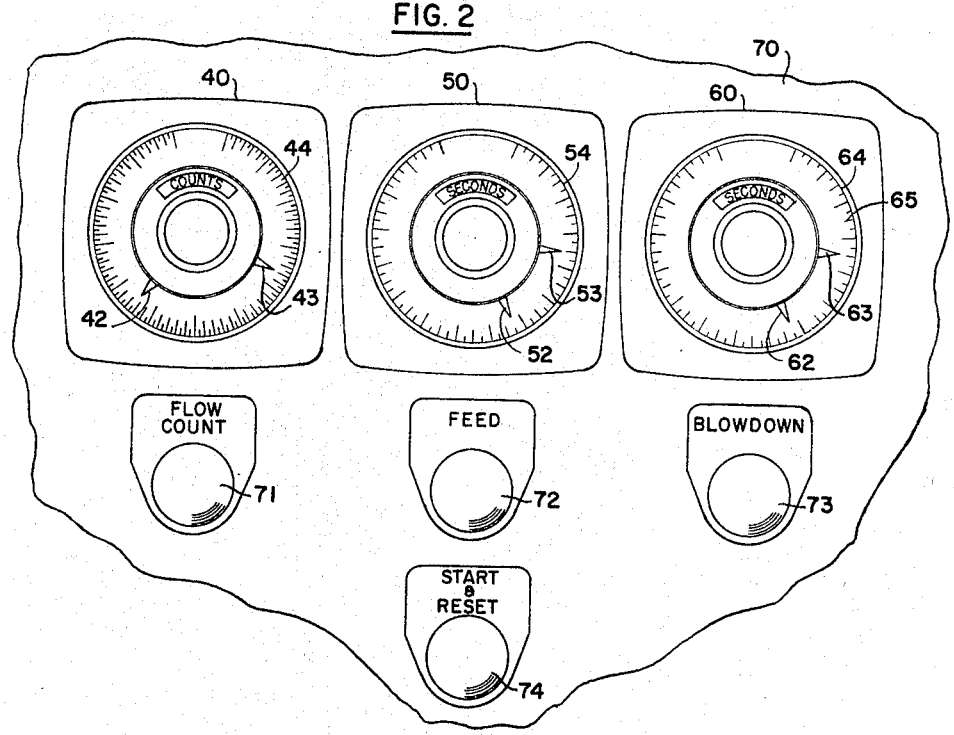
FIGURE 2 is a front elevational view of the panel showing the indicators and controls of the form of the system shown in FIGURE 1.

Meter 28 is of a conventional type which gives one or more electrical impulses per revolution of the hand. These impulses are accumulated on an impulse counter 40 of a conventional prior art type as seen in FIGURE 2. Knob 41 is rotated and carries with it pointer 42 which is set at the proper graduation of dial 44. When the quantity of makeup indicated by pointer 42 passes through makeup line 27, timers controlling blowdown and chemical feed will be actuated. In originally setting the system up, or at subsequent setting of the system, the feedwater will be analyzed and the chemical feeds and blowdowns required will be computed. The counter 40 and the timers 50 and 60 will then be set, by adjusting indicators 42, 52 and 62, respectively, to obtain proper periodic treatment. After delivery of the preset impulses (units of liquid) to the counter, the counter energizes the timers, then recycles itself back to zero. Quantity setting on the impulse counter 40 can be instantly changed by resetting indicator 41 when needed.

With each impulse the count indicating pointer 43 steps around the graduated dial 44 from the count control setting indicated by pointer 43 back to zero showing counts remaining before contact action. At zero the load contacts are actuated and the counter 43 automatically resets to start position. The impulse switch of counter 40 must close and release to advance one count.

Pump 35, which operates the chemical feed, is controlled by timer 50 as seen in FIGURE 2 wherein the duration of the timing cycle is set by rotating knob 51 to rotate indicating pointer 52 to the required seconds per timing cycle as shown by graduations 54 on the dial. Moving pointer 53 indicates the seconds remaining in each timing cycle as the indicator 53 rotates to the zero setting position. When the timer times out, pointer 53 returns to the position set by indicating pointer 52 and remains there until the proper electric signal is received from the flow counter 40 to start the chemical feed cycle.

A blowdown timer 60 is similar to counter 50 in construction and operation and has a setting knob 61 which controls the indicating pointer 62 and a moving pointer 63 and a dial 64. Counter 40 and timers 50 and 60 are suitably mounted in a control panel 70 carrying on the reverse side the circuits which will be subsequently described.

Flow counter impulses are indicated by flashing light 71. The feed timer impulses are indicated by flashing light 72 and the blowdown impulses are indicated by flashing light 73.

A start and reset button is indicated at 74 wherein the system is started or reset by pushing the said button.

Considering the operation in general, and referring to FIGURES 1 and 2, system reset push button 74 is actuated which resets counter 40 and timers 50 and 60 by energizing and disengaging their respective clutches. The setting knob 41 of counter 40 is turned to the desired number of counts as indicated by indicator 42. The setting knobs 51 and 61 of the feed and blowdown timers are also set to the desired time settings.

In operation, the counter 40 will receive its counting impulses from the externally located contact making flowmeter 28. When the counter receives the number of pulses set on the counter dial 44 by pointer 42, it will count out and simultaneously start the feed timer 50 and the blowdown timer 60, and the counter 40 will immediately reset and start a new counting cycle. The signal light 71 will indicate the counting pulses of the counting operation. The feed timer 50 will energize the feed pump 35 for the time set on the feed timer dial by pointer 52 and the signal light 72 will indicate this feed operation. The blowdown timer 60 will energize the blowdown solenoid valve 32 for the time set on the dial of the blowdown timer by pointer 63 and signal light 73 will indicate this blowdown operation. At the timed out condition, the feed timer 50 will shut off the feed pump 35 and signal light 72, and the blowdown timer 60 will shut off the blowdown solenoid valve 32 and signal light 73. Both timing operations are complete until the counter again counts out starting both timers 50 and 60 on a new timing cycle.

Both the feed timer 50 and the blowdown timer 60 start timing simultaneously and the feed and blowdown operations start together. The length of the feed time cycle and the length of the blowdown time cycle are each independently adjustable and either one can be set for a shorter or longer time cycle than the other. However, the individual time setting of either the feed or blowdown timer is set for a period shorter than the length of time required for the counter 40 to complete its counting cycle.

The operation of counting a predetermined flow followed by a timed feed and blowdown will continue indefinitely until operation is interrupted by turning the power selector switch to the off position.

An agitator 80 in the form of blades 81 mounted on a shaft 82 rotated by an agitator motor 83 is permissibly used to mix each batch of pre-weighed chemicals within the chemical feed container 33. The agitator is energized manually to mix each batch of chemicals, and de-energized manually when the mixing is complete. The operation of the agitator is totally independent of any automatic or manual timing operation of the system.

It may be desirable to feed acid into the make-up from an acid storage container 36 through line 37 to acid feed pump 38 into make-up line 27 or elsewhere in the system. Where this is desirable, an acid timer similar to the feed timer 50 is added to the system and periodically under the influence of counter 40 times out a period during which the acid feed pump 38 feeds acid into the system.

Considering now the wiring circuits of the invention in detail and referring to FIGURE 3, a 460 volt 60 cycle 3 phase supply voltage 100 passes through circuits 101, 102, 103 through control panel disconnect switch 105, to the normally open contacts of agitator motor starter 164 and feed pump motor starter 192 of agitator motor 83 and feed pump motor 35 respectively. Circuits 101 and 102 are connected to the primary winding 114 of power transformer 115, having a 120 volt secondary winding 116.

Secondary winding 116 feeds the control system which consists primarily of two main branch circuits 118 and 120. The branch control circuit 118 controls the chemical feed function and the branch circuit 120 controls the blowdown function.

Control circuit 118 includes conductor 122 and ground 124 grounded at 126. Circuit 128 is connected across circuits 122 and 124 in parallel and includes normally open blowdown relay contact 130-1, blowdown solenoid valve 132 connected to blowdown valve 32 and normally open blowdown relay contact 130-2.

Main branch circuit 118 includes lead 136 and ground 124 and feeds parallel circuits 138, 140 and 142. Circuits 138 and 140 include a panel selector switch 144 having an off position 144-1 and a hand agitate position 144-2 and an automatic on position 144-3, an agitator stop push button switch 156, agitator start push button switch 158, signal light 162, agitator motor starter coil 164', normally closed agitator motor starter coil contacts 164-1 and 164-2, and normally open agitator motor starter auxiliary contacts 164-3.

Lead 166 connects through panel selector switch 144 to lead 140 and feeds parallel circuits 168, 170, 172 and 174.

Circuit 168 includes signal light 176. Circuit 170 connects through systems reset push button switch 74 to parallel circuits 180, 182, 184 and 186.

Circuit 180 includes normally closed timer contacts 50-1 and 50-2, feed motor starter coil 192' and normally closed starter coil contacts 192-1 and 192-2.

Circuit 180 connects with circuit 198 which includes signal light 72. Circuit 182 includes normally closed timer contacts 50-3 and timer 50. Circuit 184 includes normally closed timer contacts 60-1 and 60-2, signal light 73 and blowdown relay coil 210. Circuit 186 includes normally closed timer contacts 60-3 and timer 60. Circuit 172 includes switch contacts 74-2, flowmeter 28, normally closed counter load switch contacts 40-1 and 40-2, counter 40 and signal light 71.

Branch circuit 218 includes normally open timer contacts 60-4 and counter clutch 40'. Branch circuit 220 includes counter contacts 40-3 and timer clutch 50'. Branch circuit 222 includes normally open timer contacts 50-4 and timer clutch 60'. Branch circuit 142 includes normally open feed motor starter auxiliary contacts 192-3 and acid pump motor 224.

Considering now the operation, the control panel disconnect switch 105 is closed and the 460 volt supply voltage is connected to the normally open agitator motor starter contacts 164 and the feed pump motor starter contacts 192 connected to the agitator motor 112 and the feed pump motor 113 respectively. The supply voltage is also connected to the primary winding 114 of the power transformer 115.

The secondary winding 116 feeds main branch circuit 118 controlling the chemical feed function and main branch circuit 120 controlling blowdown function. For automatic operation, the panel selector switch 144 is turned to the automatic on position 144–3 whereby circuits 138, 140, 166 and 138 become permissive.

The panel will normally start its control functions from the condition that existed prior to the panel selector switch 144 being turned to the off position 144–1. However, if a new automatic operation is desired when starting up, all controls can be restored to their zero condition by pushing the system-reset push button switch 74. Switch contacts 74–2 open and interrupt circuit 172 to flowmeter 28. Switch contacts 74–1 open and interrupt circuit 170, deenergizing feed pump motor starter 192, interrupting the chemical feed function and deenergizing blowdown relay coil 210, interrupting the blowdown function of the blowdown solenoid valve 132. Switch 74 also closes contacts 74–3 completing circuit 174. This also energizes and resets the timer clutches 50′ and 60′ and counter clutch 40′.

System reset switch 74 is then released and circuits 170 and 172 become permissive and circuit 174 is interrupted deenergizing the clutches 50′ and 60′ of timers 50 and 60 respectively and clutch 40′ of counter 40. Circuit 172 feeds contacts 28–1 and 28–2 of flowmeter 28.

As flow of make-up water progresses through the meter 28, the meter contact 28–2 will close momentarily to pulse the counter 40 through counter load contacts 40–1. At each momentary closure of flowmeter contact 28–2, counter 40 will add one count to its mechanism and the signal light 71 will light indicating the counting operation. During the counting operation, closure of the flowmeter contacts 28–2 will have no effect on timer contacts 60–4, counter contacts 40–3, and timer contacts 50–4.

When the counter 40 accumulates the number of counts set on its dial, the counter will count out, closing counter contacts 40–3 which will energize the clutch 50′ of timer 50 controlling chemical feed pump 35 and energize the clutch 60′ of timer 60 controlling blowdown valve 32.

When the clutch 50′ of timer 50 is energized, contacts 50–1 are closed, 50–2 are open, 50–3 are closed, and 50–4 are closed.

When the clutch 60′ of timer 60 is energized, contacts 60–1 are closed, contacts 60–2 are open, contacts 60–3 are closed, and contacts 60–4 are closed.

When the clutch 40′ of counter 40 is energized, contacts 40–1 are closed, contacts 40–2 are open, and contacts 40–3 are open.

When timer switch contacts 60–4 closes, clutch 40′ of counter 40 is energized, resetting its mechanism and closing its switch contacts 40–1 and opening its switch contacts 40–3 which removes the energizing circuit from timer clutches 50′ and 60′. However, these two timer clutches as well as the counter clutch 40′ will remain energized through holding contacts 50–4 and 60–4. This condition will hold until, as flow progresses, the flowmeter 28 will break its contact 28–1 interrupting these holding circuits, thus deenergizing timer clutches 50′ and 60′ and counter clutch 40′. The timers 50 and 60 start timing and the counter 40 begins its counting operation. The first count will register when the flowmeter completes its contact 28–2.

When the timer clutch 50′ is deenergized, timer 50 starts timing and contacts 50–1 remain closed, contacts 50–2 close, contacts 50–3 remain closed, and contacts 50–4 open.

When the contacts of timer 50 are in the above condition, the circuit is completed to the feed pump motor starter coil 192 starting feed pump motor 113 of pump 35 and the chemical feed function is started. Signal light 72 signals this operation.

Simultaneously with the start of chemical feed function as described above, the clutch 60′ of timer 60 starts timing, and contacts 60–1 remain closed, contacts 60–2 close, contacts 60–3 remain closed, and contacts 60–4 open.

With contacts 60–1 and contacts 60–2 closed, the circuit is completed to the blowdown relay coil 210 to close the two sets of normally open relay contacts 130 and 134, thus energizing the blowdown solenoid 132 to open the blowdown valve 32 to institute the blowdown function. Signal light 73 signals the blowdown function.

These functions will continue until timers 50 and 60 time out, at which time relay contacts 50–1 open, deenergizing the chemical feed function, signal light 72 goes off, contacts 50–2 remain closed, contacts 50–3 open, and contacts 50–4 remain open.

At time out, timer contacts 60–1 open, deenergizing the blowdown relay coil 60 and deenergizing the blowdown function. Signal light 73 goes off, contacts 60–2 remain closed, contacts 60–3 open, and contacts 60–4 remain open.

Counter 40, which has been accumulating counts during the timing function, counts out sometime after both timing functions have been completed. At counter 40 count out, the counter contacts 40–3 will close and energize the timer clutches 50′ and 60′.

The operation of counting a predetermined flow of make-up feed water followed by a timed chemical feed and blowdown will continue indefinitely until operation is interrupted by turning the panel selector switch 144 to the off position 144–1.

During automatic operation, the agitator function can be introduced by momentarily pushing agitator start push button switch 158 which energizes the starter coil of agitator motor 164 through connecting circuits to the motor starter 164 to ground.

The starter 164 will sustain its operation through starter auxiliary contacts 164–1 which is a holding circuit. Signal light 162 will signal this operation. The agitator operation can be terminated by pushing agitator stop push button 156 which interrupts the holding circuit 164–1 deenergizing agitator motor starter coil 164 and signal light 162.

The agitator may be activated only with no chemical feed or blowdown. With the selector switch 144 turned to the hand agitate position 144–2, the selector switch circuit 138 is completed to the agitator start push button 158. The agitator start push button 158 is momentarily pushed to energize starter agitator motor starter coil 164. The starter coil 164 will sustain its operation through starter auxiliary contacts 164–1 which is a holding circuit. Signal light 162 will signal this operation. The agitator operation can be terminated by pushing agitator stop push button 156 which interrupts the holding circuit through 164–1, deenergizing the agitator motor starter coil 164 and signal light 162.

Preferably all signal lights are of the push-to-test type. These lights may be tested at any time that the panel disconnect switch 104 is in the on position.

In some instances, it may be desirable to add the function of acid feed to the installation. The circuit 142 is connected to the secondary lead 136 and the ground 124 through feed pump starter auxiliary contact 136–1. Included in this circuit is an acid feed pump 38. The acid pump will operate in parallel with the chemical feed function which is timed by timer 50 and will feed acid under the influence of timer 50 into the system.

The above description is directed to a form of the invention in which a plurality of timers are used under the direct control of an impulse counter. However, it should be understood that the invention is equally adapted to variations which are within the scope of the invention. These variations include a form in which a plurality of timers are used to respectively control the blowdown valve, the chemical feed pump and optionally the acid feed pump wherein the impulse counter actuates a first of these timers and this timer in turn controls or actuates the remaining timers. In this form of the invention, the impulse counter may actuate two of the timers with one of these two timers controlling or actuating the third timer.

In still another form of the invention, only one timer is used which is actuated by the impulse counter, the timer in turn controlling the blowdown function, the chemical feed function, and optionally the acid feed function.

In view of my invention and disclosure, variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention what I claim as new and desire to secure by Letters Patent is:

1. In a system for automatically removing through a blowdown valve a portion of chemically conditioned circulating water fed by makeup water from a makeup water line and circulated and recycled alternately through a flow circuit including cooling and heat exchange apparatus, and automatically maintaining a predetermined quantity of chemical in the circulating water; an impulse meter in the makeup water line for measuring the makeup water and sending electrical impulses as a function of the quantity of makeup water measured, an impulse counter for receiving the electrical impulses from the meter, a chemical feed pump for adding the chemical to the flow circuit, and a timer responsive to a preset number of impulses received by the impulse counter to actuate the blowdown valve and the chemical feed pump for a preselected amount of time.

2. The system of claim 1 in which there are first and second timers, one of which controls the operation of the blowdown valve and the other of which controls the operation of the chemical feed pump, wherein the first timer is actuated by the impulse counter, and the second timer is actuated by the first timer.

3. The system of claim 2 wherein both first and second timers are actuated by the impulse counter.

4. In a system for automatically removing through a blowdown valve a portion of chemically conditioned circulating water fed by makeup water from a makeup water line and circulated and recycled alternately through a flow circuit including cooling and heat exchange apparatus, and automatically maintaining a predetermined quantity of chemical and acid in the circulating water; an impulse meter in the makeup water line for measuring the makeup water and sending electrical impulses as a function of the quantity of makeup water measured, an impulse counter for receiving the electrical impulses from the meter, a chemical feed pump for adding the chemical to the flow circuit, an acid feed pump for adding the acid to the circulating water, and a timer responsive to a preset number of impulses received by the impulse counter to actuate the blowdown valve, the chemical feed pump, and the acid feed pump, for a preselected amount of time.

5. The system of claim 4 in which there are first, second, and third timers, one of which controls the operation of the blowdown valve, one of which controls the operation of the chemical feed pump and one of which controls the operation of the acid feed pump, wherein the first timer is actuated by the impulse counter and the second and third timers are controlled by the first timer.

6. The system of claim 5 wherein the first and second timers are actuated by the impulse counter and one of said first or second timers controls the third timer.

7. The method of automatically removing a portion of chemically conditioned circulating water fed by makeup water, and automatically maintaining a predetermined quantity of chemicals in the circulating water, comprising measuring the makeup water with an impulse meter and sending electrical impulses as a function of the quantity of makeup water measured, receiving the electrical impulses from the meter on an impulse counter, actuating a timer responsive to a preset number of the electrical impulses received by the impulse counter, and operating the blowdown valve and a chemical feed pump for a preselected amount of time under the control of the timer to remove a portion of the circulating water and to add chemicals to the remainder of the circulating water.

References Cited by the Examiner

UNITED STATES PATENTS

| | | | |
|---|---|---|---|
| 2,977,199 | 3/1961 | Quittner | 137—3 X |
| 3,096,779 | 7/1963 | Kraft | 137—624.14 X |

WILLIAM F. O'DEA, *Primary Examiner.*

ALAN COHAN, *Examiner.*